(12) United States Patent
Ondruska et al.

(10) Patent No.: US 12,367,677 B1
(45) Date of Patent: Jul. 22, 2025

(54) REAL-TIME VIDEO EVENT DETECTION USING EDGE AND CLOUD AI

(71) Applicant: Coram AI, Inc., Sunnyvale, CA (US)

(72) Inventors: Peter Ondruska, London (GB); Ashesh Jain, Sunnyvale, CA (US); Balazs Kovacs, San Mateo, CA (US); Luca Bergamini, London (GB)

(73) Assignee: Coram AI, Inc., Sunnyvale, CA (US)

( * ) Notice: Subject to any disclaimer, the term of this patent is extended or adjusted under 35 U.S.C. 154(b) by 0 days.

(21) Appl. No.: 19/025,673

(22) Filed: Jan. 16, 2025

Related U.S. Application Data

(63) Continuation of application No. 18/903,879, filed on Oct. 1, 2024.

(51) Int. Cl.
| | |
|---|---|
| *G06V 20/40* | (2022.01) |
| *G06F 40/279* | (2020.01) |
| *G06V 10/774* | (2022.01) |
| *G06V 10/82* | (2022.01) |
| *G06V 20/52* | (2022.01) |

(52) U.S. Cl.
CPC ............ *G06V 20/44* (2022.01); *G06F 40/279* (2020.01); *G06V 10/774* (2022.01); *G06V 10/82* (2022.01); *G06V 20/41* (2022.01); *G06V 20/52* (2022.01)

(58) Field of Classification Search
None
See application file for complete search history.

(56) References Cited

U.S. PATENT DOCUMENTS

| | | | |
|---|---|---|---|
| 2021/0133462 A1* | 5/2021 | Roberts | G06F 18/214 |
| 2022/0392225 A1* | 12/2022 | Jakobsen | G06N 20/20 |
| 2023/0055581 A1* | 2/2023 | Bidstrup | H04N 7/181 |
| 2023/0267718 A1* | 8/2023 | Coimbra De Andrade | G06N 3/047 382/103 |

* cited by examiner

*Primary Examiner* — Leon Flores
(74) *Attorney, Agent, or Firm* — Nicholson DeVos Webster & Elliott LLP

(57) ABSTRACT

Embodiments are disclosed for real-time event detection using edge and cloud AI. An event monitoring system can receive live video data from one or more video capture devices at a surveillance location. A first machine learning model identifies a first portion of the live video data as depicting an event. The first portion of the live video data is provided to a second machine learning model. The second machine learning model identifies the first portion of the live video data as depicting the event. An event notification corresponding to the event is then sent to a user device.

19 Claims, 11 Drawing Sheets

REAL-TIME VIDEO EVENT DETECTION USING EDGE AND CLOUD AI

BACKGROUND

Video surveillance has become ubiquitous in modern life. It is now common for users to set up and manage home video surveillance systems, with multiple competing device ecosystems to choose from. In the business or enterprise context, video surveillance is generally provided by cameras in and around an office, job site, etc. These cameras may feed real-time video data to a central security desk and/or record the footage for later review.

SUMMARY

Embodiments are disclosed for real-time event detection using edge and cloud AI. An event monitoring system can receive live video data from one or more video capture devices at a surveillance location. A first machine learning model identifies a first portion of the live video data as depicting an event. The first portion of the live video data is provided to a second machine learning model. The second machine learning model identifies the first portion of the live video data as depicting the event. An event notification corresponding to the event is then sent to a user device.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
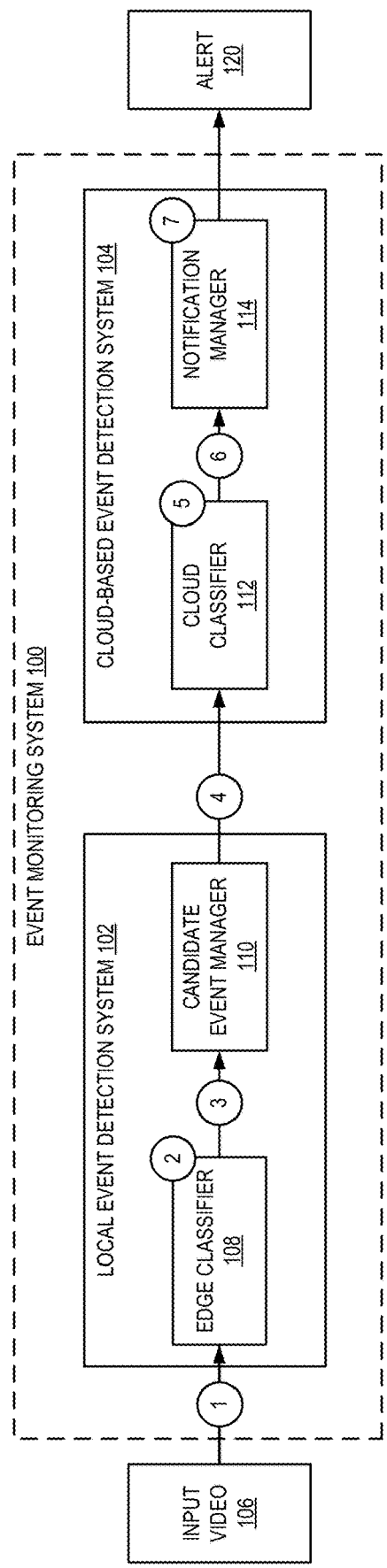
FIG. 1 illustrates a diagram of a process of real-time event detection using edge and cloud AI in accordance with one or more embodiments.

One or more embodiments of the present disclosure enable real-time event notification using edge and cloud-based artificial intelligence. Traditional video surveillance collects a lot of raw video data. This is particularly true for businesses which may use a large number of cameras to monitor their offices, warehouses, campuses, etc. While such monitoring may provide some deterrence effects, actually using the surveillance data can be quite difficult. For example, identifying a relevant object or person of interest by manually reviewing hours of recordings across tens or hundreds of devices is expensive, time consuming, and resource intensive.

Event detection in the context of video surveillance and closed-circuit television (CCTV) systems is ability to detect occurrence of various critical conditions that are represented in the video feed, such as, weapon detection, fire detection, accident detection, shoplifting, or other events. However, accurate and versatile real-time detection of events of interest in a large amount of video is inherently difficult and an open problem facing numerous data, computational and network bandwidth constraints. For example, the amount of data processed by CCTV for video surveillance systems is significant. A typical installation can involve hundreds of cameras each producing a 5 Megapixel 30 FPS stream 24/7.

Additionally, the need for high accuracy is paramount. Users do not want to miss an important true positive event (e.g., "person with a gun"), and at the same they do not want to be notified about similar but false positive events (e.g., "person with an umbrella"). Further, depending on the type of event, real-time or near real-time performance is needed. This means a maximum latency on the order of seconds is important so that appropriate actions can be taken.

Existing AI solutions face an accuracy vs. computational cost trade-off. For example, fast methods, such as small neural networks models can run efficiently on compute-constrained devices and process large quantities of data real-time but their accuracy is not very high. On the other hand, large, resource intensive models, such as large language models (LLMs), are very accurate. However, the compute requirements of such models generally restrict the models to being run only in large data centers resulting in high cost and limited throughput. This makes them not suitable for real-time processing of large amounts of data.

Additionally, current CCTV systems are generally constrained in terms of network bandwidth. While bandwidth on a local network is unconstrained, the bandwidth between the local network and a cloud data center is generally limited. As a result, the bandwidth is usually not sufficient to transfer all the video between CCTV cameras and cloud datacenters.

Versatility and robustness of the system is also an important factor. It needs to be able to detect a wide range of events (e.g., weapon detection, accident detection, fire detection, theft detection, etc.) in a wide range of conditions with minimal additional development or setup cost.

Finally, the ability to efficiently improve (e.g., fine-tune) systems over time is also an open challenge. Traditional methods of improving machine learning systems are through human-annotation of a training dataset. The training dataset can be different to data actually observed in production. Also, the amount of data is typically quite large, which makes annotating all of it prohibitively expensive.

Embodiments address these and other deficiencies in the prior art by providing a scalable method for building a flexible, high-accuracy high-throughput real-time detection of video events in CCTV, video surveillance and video intelligence systems. In some embodiments, the input to the system is one or more live video feeds originating from installed cameras on premises (e.g., a customer's surveillance location such as an office, campus, warehouse, etc.).

The video feeds can then be processed by a combination of AI models running on edge devices installed at the customer's location and/or AI models running in the cloud (e.g., a cloud service environment which hosts a large more accurate model). This combines the benefits of both local and cloud processing systems while obeying computational and network bandwidth constraints. When an event of interest is detected, the user is notified through a suitable channel (i.e. SMS message, email, app notification, phone call, etc.).

FIG. 1 illustrates a diagram of a process of real-time event detection using edge and cloud AI in accordance with one or more embodiments. As shown in FIG. 1, an event monitoring system 100 can include a local event detection system 102 and a cloud-based event detection system 104. In some embodiments, the local event detection system 102 may be implemented as, or executing on, a Network Video Recorder (NVR). The NVR may be a computing device, comprising one or more processing devices (central processing units, graphics processing units, accelerators, field programmable gate arrays, etc.), deployed to a customer site. In some embodiments, the cloud-based event detection system 104 may be implemented in a cloud services environment in which compute resources are allocated to users from across hardware and/or virtual servers. In examples described herein, a customer site may refer to any location or locations where one or more NVRs and one or more video capture devices (e.g., cameras) are deployed. The customer site may also be referred to as a surveillance location.

At numeral 1, the local event detection system 102 receives input video 106. Input video 106 may include one or more video streams from one or more video capture devices deployed to a customer site. In some embodiments, the video capture devices include video cameras installed on premises recording the monitored area. The video cameras may include IP cameras that stream encoded h264/h265 video over a local network to the connected Network Video Recorder (NVR) hosting edge classifier 108.

As shown in FIG. 1, the local event detection system 102 can include an edge classifier 108 and a candidate event manager 110. In some embodiments, the edge classifier 108 may include one or more machine learning models trained to identify events within video data. For example, the edge classifier may receive a snippet (e.g., a plurality of frames) of the input video 106 and determine whether an event is depicted in that snippet. As discussed further below, the edge classifier may include a first model which generates a video embedding corresponding to the snippet. The video embedding may then be processed by a second model to classify the embedding. At numeral 2, the edge classifier processes a snippet of the input video 106. If no event is detected, then processing may proceed to a next snippet. If, however, an event is detected, then at numeral 3 the snippet is provided to candidate event manager 110.

The candidate event manager 110 may manage a connection between the local event detection system 102 and the cloud-based event detection system 104. In some embodiments the local event detection system 102 and the cloud-based event detection system 104 may be connected over one or more networks, including the Internet. The candidate event manager can ensure that the snippet is formatted appropriately to be processed by the cloud classifier 112. The candidate event manager 110 can also ensure that the video data is provided to make full use of the available bandwidth. At numeral 4, candidate events are passed from the local event detection system 102 to the cloud-based event detection system 104.

At numeral 5, cloud classifier 112 receives the candidate snippets. The cloud classifier may be a multi-modal machine learning model. Recently, multi-modal machine learning techniques have enabled natural language processing (NLP) techniques to be used with image and video systems. For example, multi-modal models, such as Contrastive Language-Image Pretraining (CLIP), allow for a mix of data from different domains (e.g., text data and image/video data) to be applied to a specific task. At numeral 6, the classification of each snippet can be provided to notification manager 7. In some embodiments, only the video snippets classified as positively representing an event are provided to the notification manager 114.

At numeral 7, notification manager 114 generates a notification to the user in the form of an alert 120. In some embodiments, the event monitoring system 100 notifies the user about the occurrence of the event. This might be using various methods, such as SMS, email, phone call, app notification, etc. In some embodiments, the notification can optionally include full or part of the video clip capturing the event, as well as description of the event or any other output provided by the cloud classifier. In some embodiments, the user has an option to confirm the event or label it as a false positive detection.

The example described above corresponds to an installation with a single NVR. For example, the edge classifier 108 and candidate event manager 110 execute on one NVR which has access to video data from all of the cameras at that installation. However, large-scale deployments of several hundreds of cameras or across multiple locations may require several edge devices (e.g., NVRs) to be installed. In such embodiments, the NVRs may execute in parallel, each processing data from a different subset of cameras.

Figure 2:
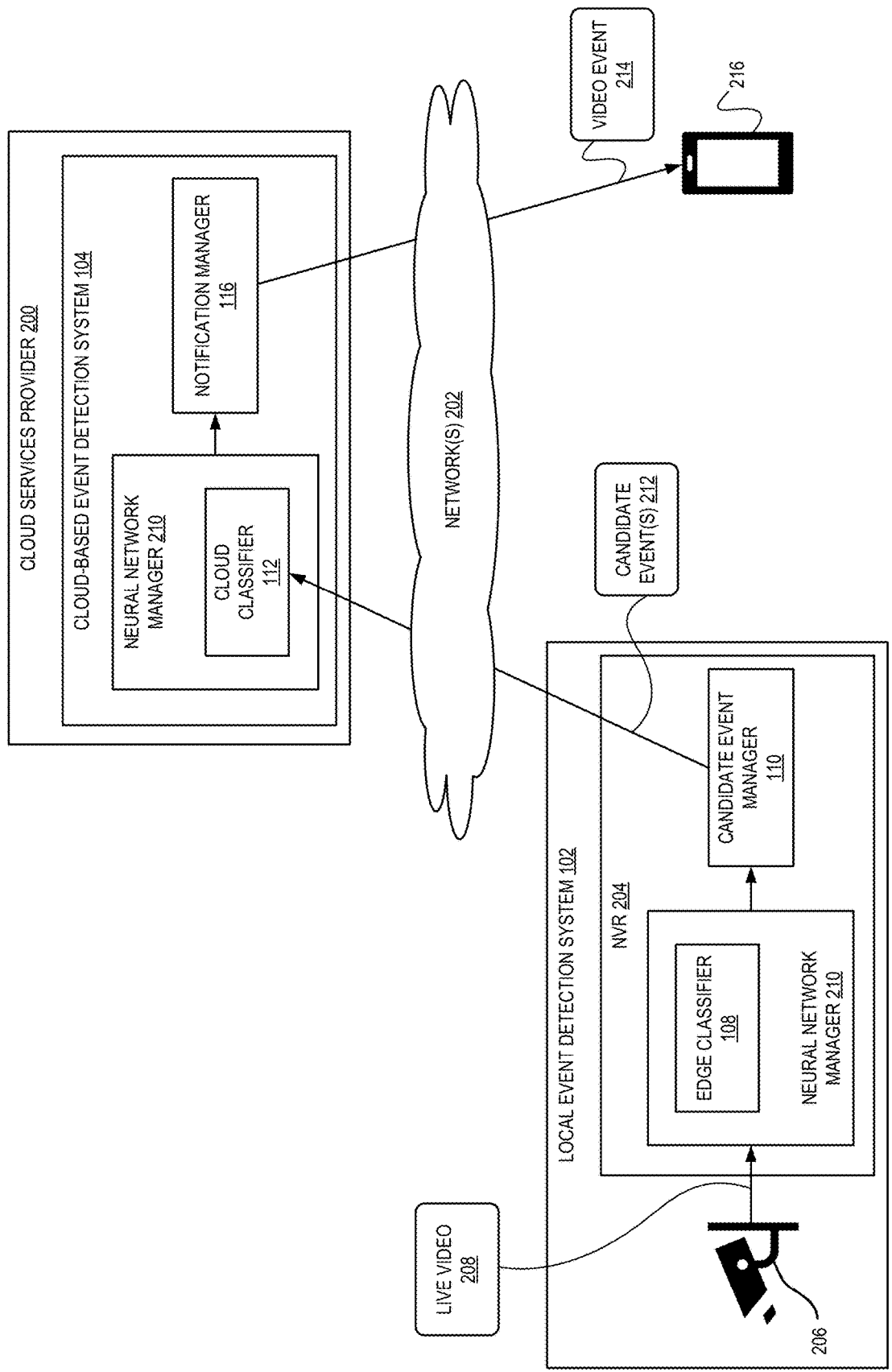
FIG. 2 illustrates a diagram of a system for providing real-time event detection using edge and cloud AI in accordance with one or more embodiments.

FIG. 2 illustrates a diagram of a system for providing real-time event detection using edge and cloud AI in accordance with one or more embodiments. As shown in FIG. 2, event detection is distributed between a high-throughput/low-accuracy edge classifier 108 running locally and a low-throughput high-accuracy cloud classifier 112 running in a cloud environment (e.g., a data center). For example, a real-time event detection system can include a local event detection system 102 and a cloud-based event detection system 104. The cloud-based event detection system 104 may be hosted by a cloud services provider 200. A cloud services provider 200 may implement various cloud computing models, such as infrastructure as a service (IaaS), platform as a service (PaaS), and/or software as a service (SaaS). For example, all or portions of the cloud-based event detection system 104 may be implemented as one or more cloud software applications which are made available to various customers. Although not shown in FIG. 2, the cloud services provider 200 may make a variety of services available to customers which may or may not be utilized in addition to the cloud-based event detection system 104 (e.g., cloud storage services, AI hosting services, AI training services, etc.).

One or more local event detection systems 102 may communicate with the cloud-based event detection system 104 via one or more networks 202, such as the Internet. As shown in FIG. 2, a customer site can include one or more surveillance cameras 206, such as CCTV cameras. These may include any networkable image or video capture devices, such as IP cameras. As used herein, networkable may refer to any device capable of wired or wireless communication with the natural language video monitoring system 100. As discussed, the local event detection system 102 may include one or more NVRs 204, on which the edge classifier 108 and candidate event manager 110 may be hosted. In some embodiments, the cameras 206 may include sufficient compute resources to host all or portions of the edge classifier and event manager without a need for a separate NVR. In some embodiments, the NVR 204 can include a neural network manager 210.

The cameras 206 may be deployed to various locations around a customer site. Each camera may stream live video data 208 to the NVR 204. When the video data is received it is processed by edge classifier 108. As discussed, the NVR 204 may include a neural network manager 210 that provides an execution environment for one or more machine learning models, including edge classifier 108. In some embodiments, multiple models may execute in the same neural network manager. Alternatively, each machine learning network may be associated with its own neural network manager. In some embodiments, the neural network manager 210 may be an edge neural network manager that is configured to provide an execution environment specifically for edge devices. For example, the execution environment may be for lightweight models optimized to execute with lower resource requirements.

As discussed, the live video data 208 may be provided to the edge classifier 108 in clips, also referred to as snippets, which may represent a plurality of frames of the live video. The edge classifier 108 can then determine whether an event it has been trained to detect is represented in the clip. If so, candidate event manager 110 can send the clip to the cloud-based event detection system 104. These candidate events 212 can then be evaluated by the more accurate cloud classifier 112. This allows for the benefit of the accuracy of the cloud classifier 112 to be reserved for only those clips most likely to include an event. This greatly reduces the network resource costs of transferring all of the live video over the networks 202 to the cloud-based event detection system 104.

Once received by the cloud classifier 112, the cloud classifier 112 can determine whether the candidate events 212 include a depiction of an event. If so, notification manager 116 can then generate and send one or more notifications, based on a notification policy. For example, each event type may be associated with a notification policy (e.g., a security event notifies one set of people, while an emergency event such as a fire notifies a different set of people, etc.). The notification of the video event 214 may include a description of the event and/or a clip of the event. The notification may be sent to a user's computing device 216 (e.g., mobile device, laptop, desktop, etc.) over one or more channels (e.g., email, SMS, push notification through an app, etc.). By distributing the computing across the local and cloud-based systems, the notification time can be kept within a few seconds of the real-time event occurring.

Figure 3:
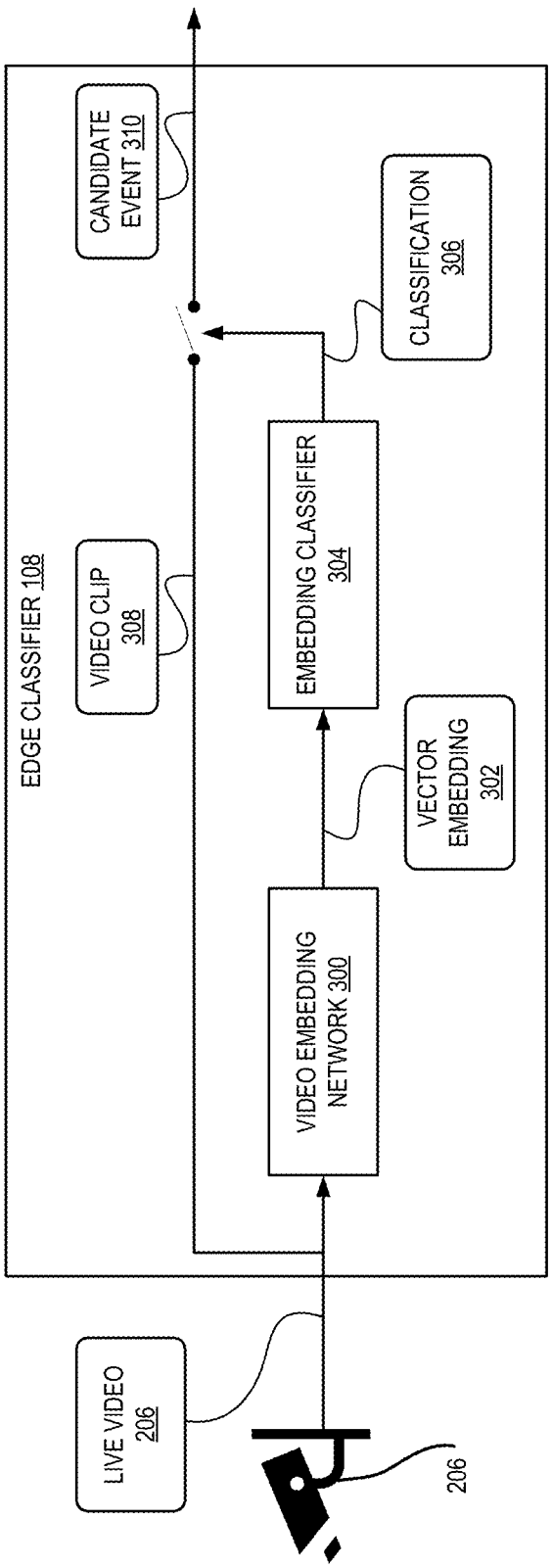
FIG. 3 illustrates a diagram of an edge classifier in accordance with one or more embodiments.

FIG. 3 illustrates a diagram of an edge classifier in accordance with one or more embodiments. As discussed, the edge classifier may be implemented as a machine learning system running locally (e.g., at a customer location) accepting snippets of live video feed as an input and producing a classification of whether the video depicts an event of interest as output. Because the machine learning system is running on a local device (e.g., an edge device), with more limited compute resources compared to those available in a data center, the edge classifier produces less accurate results than the cloud classifier.

As discussed, the edge classifier can be deployed locally with respect to video source, such as, running on a local Network Video Recorder (NVR) or on embedded AI chip of the camera 206. As a result, there is no network bandwidth limitation between the video source (e.g., camera 206) and the edge classifier but there is a compute constraint limiting how accurate models can be run.

As shown in FIG. 3, in some embodiments, the edge classifier includes a video embedding network 300 and an embedding classifier 304. As live video 206 is received, it can be divided into snippets. In some embodiments, this may mean that the video stream is divided into snippets based on a frame setting where each snippet includes the same number of frames. Alternatively, a scene detector may be used to divide the live video into scenes, with each scene representing a different snippet. For example, the scene detector may identify a new scene based on a change of a set number of pixels in one frame compared to a previous frame. Additionally, or alternatively, other techniques may be used to divide the live video into snippets.

After a snippet is received, it is passed to video embedding network 300. Video embedding network 300 may include a neural network trained to compute a vector embedding corresponding to the video frames or detected objects/actors depicted therein using methods, such as, CLIP. The resulting vector embedding 302 is then provided to embedding classifier 304. In some embodiments, the embedding classifier 304 is responsible for classifying an embedding using a binary classifier such as logistics regression, or vector similarity to a vector corresponding to a known event type (e.g., "person with a gun"/"person without a gun". In some embodiments, the edge classifier can be any binary classifier that can detect the likelihood of occurrence of an event in a video/image data. For example, such a binary classifier may include a pre-trained neural network ConvNet/ResNet/YOLO trained on a training dataset of positive and negative examples.

In some embodiments, the embedding classifier 304 can compare the vector embedding to a reference embedding corresponding to an event type. The embedding classifier 304 may determine that the vector embedding 302 matches a reference embedding if it has a similarity value (e.g., L2, cosine similarity, or other similarity metric) greater than a threshold value. In some embodiments, the embedding classifier 304 can compare the vector embedding to a plurality of reference embeddings. Alternatively, a plurality of embedding classifiers 304 may be used to compare the vector embedding to the reference embeddings.

Embodiments efficiently utilize compute resources and also enable reconfigurability of the system to handle new or different events. For example, the embedding corresponding to a reference event only needs to be computed once while its embedding classification can be performed independently for each event of interest allowing real-time processing at high throughput (i.e. 30 frames-per-second) and low latency i.e. (30 ms). Additionally, the edge classifier can be reconfigured by replacing the embedding classifier while keeping the video embedding network the same.

If the classification 306 output of the embedding classifier for a candidate event is positive, then the candidate video clip 310 is sent to the cloud classifier for further analysis. This way the amount of video data sent to the cloud classifier is only a fraction of all produced data by video source 206.

Figure 4:
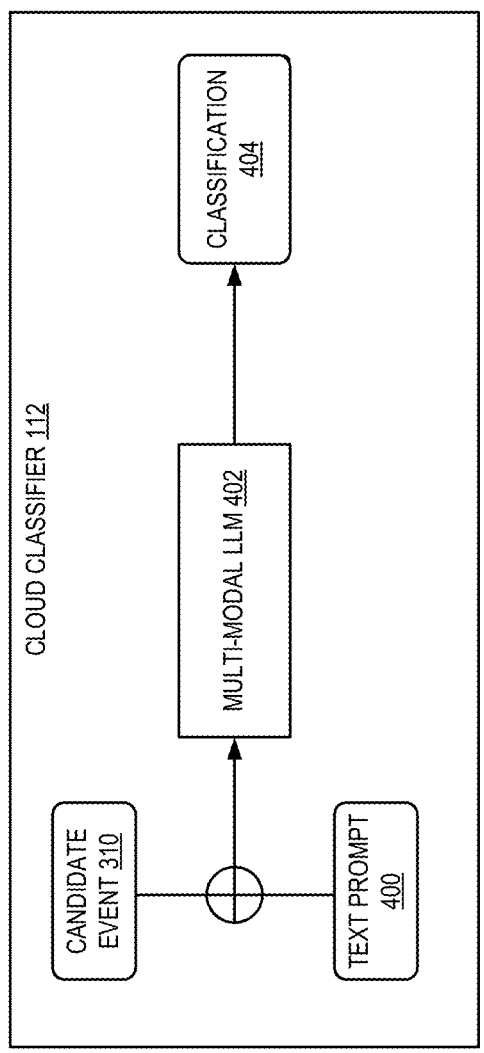
FIG. 4 illustrates a diagram of a cloud classifier in accordance with one or more embodiments.

FIG. 4 illustrates a diagram of a cloud classifier in accordance with one or more embodiments. As discussed, the cloud classifier can be implemented as a machine learning system running in a cloud services environment which accepts candidate event video clips corresponding to likely occurrences of events of interest as input, and provides high-accuracy output confirming or denying presence of the event. Given the high computational resources of the data center this classifier can be very accurate but due to compute costs reasons can process only a limited amount of data (e.g., 1 frame-per-second and 1 second latency).

In some embodiments, cloud classifier can include a multi-modal large language model 402 (e.g., such as ChatGPT or similar models). The input to the multi-modal LLM 402 can include a candidate event video clip 310 and a custom prompt 400, such as, "does the video contain a person with a gun?". The input is then tokenized and fed as an input to the transformer network that produces classification as an output, optionally with text rationale behind the output. The use of a text prompt provides versatility, as the prompt can be easily and flexibly tailored to match each event of interest by just changing the text prompt.

Alternatively, in some embodiments, the cloud classifier 112 can be implemented similarly to the edge classifier but with a significantly larger network trained on significantly more data. As a result, the cloud classifier 112 results in more accurate predictions than the edge classifier. Additionally, in some embodiments, different implementations can also utilize a black-box 3rd party classification API, such as Vertex API. If the classification 404 output by the classifier is positive, the end user is notified about the occurrence of the event.

Figure 5:
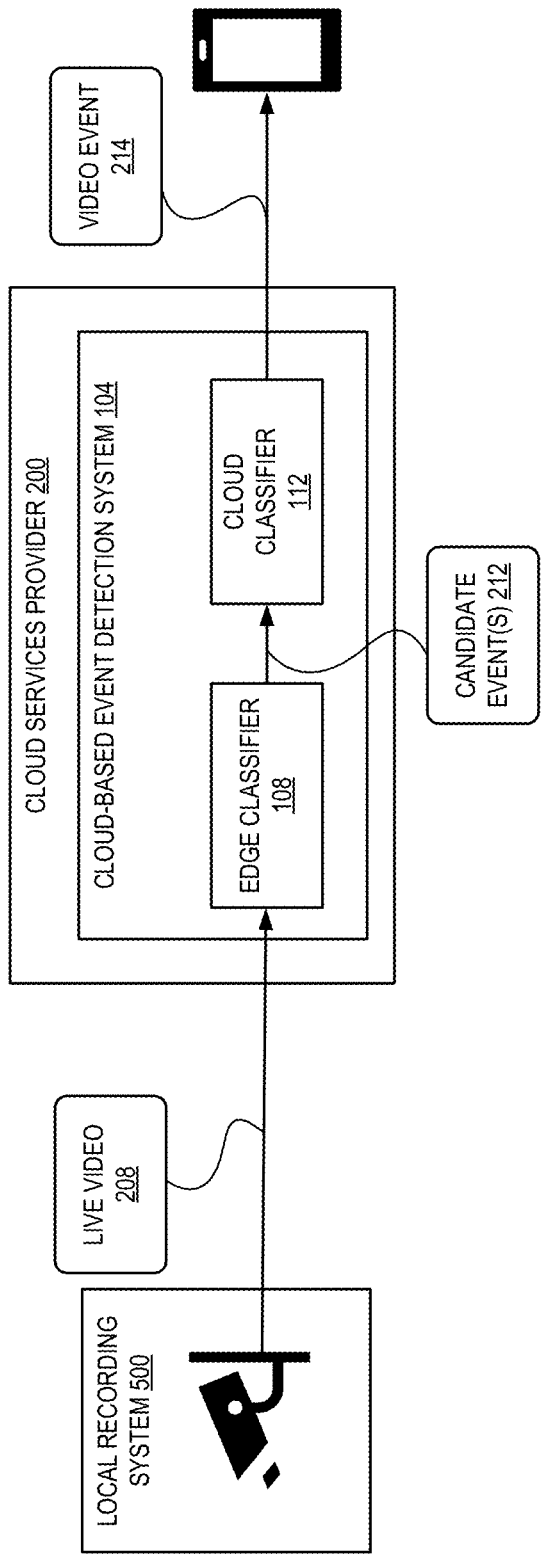
FIG. 5 illustrates a diagram of a cloud-based system for providing real-time event detection in accordance with one or more embodiments.

FIG. 5 illustrates a diagram of a cloud-based system for providing real-time event detection in accordance with one or more embodiments. As discussed, embodiments split processing between a local model and a cloud-based model because bandwidth between the local network and the cloud service provider is typically limited. However, if the bandwidth between local network and cloud service provider is sufficient, then both the edge classifier 108 and the cloud classifier 112 can be hosted by the cloud services provider 200.

As shown in FIG. 5, in such an embodiment the local system becomes a local recording system 500, which may include one or more video capture devices deployed at the customer's location. Each video capture device may be configured to stream live video 208 to the cloud services provider 200. In some embodiments, each video capture device may be internet enabled (e.g., an IP camera or similar device) and configured to stream live video data 208 to an endpoint provided by the cloud services provider. Alternatively, the local recording system 500 may include a computing device, such as an NVR (not shown), that receives the streams from the local video capture devices and sends the streams to the cloud services provider 200.

The embodiment of FIG. 5 still benefits from the composition of the low-accuracy/high-throughput classifier and high-accuracy/low-throughput classifier. This results in the ability to perform high-accuracy detection in real-time video data feeds without the need for on-premises compute hardware. For example, the edge classifier 108 serves the same function as discussed above of filtering out video snippets that have a high likelihood of including a depiction of an event. Only these candidate events 212 are then processed by the more compute-intensive, but more accurate, cloud classifier 112. This allows for events to be processed in near real-time, with latency on the order of a few seconds. The embodiment depicted in FIG. 5 does have high network and data bandwidth constraints are though higher compared to embodiments that use a locally hosted edge classifier.

Figure 6:
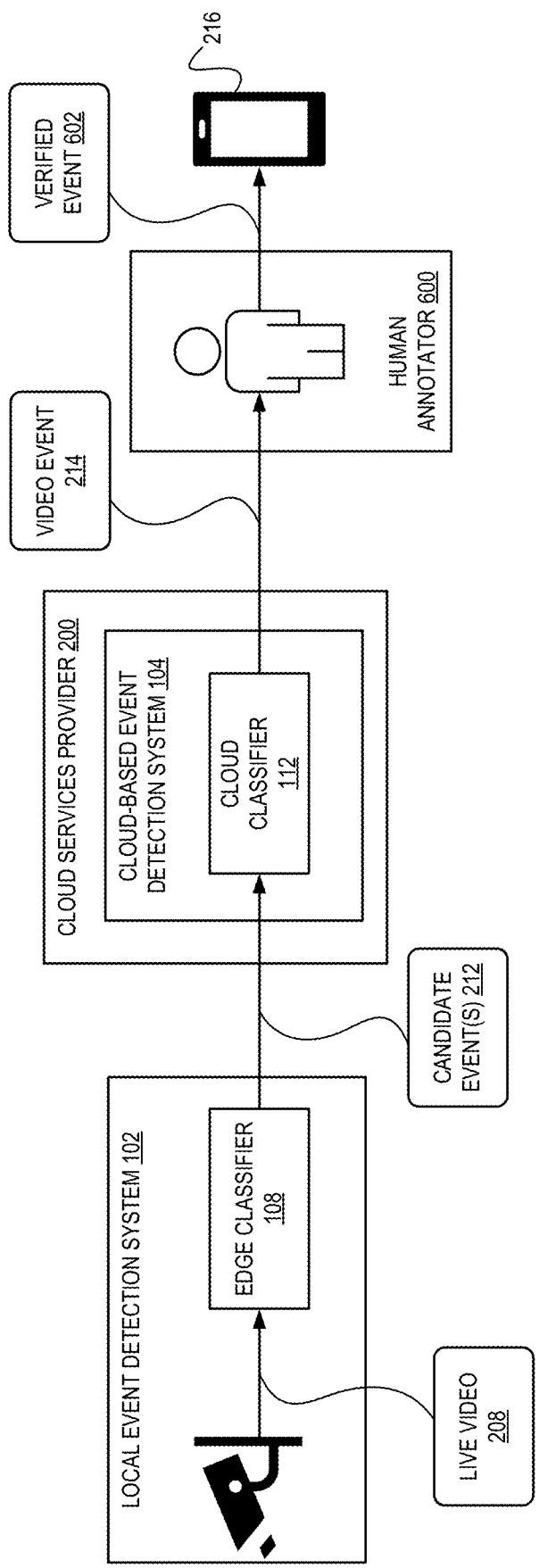
FIGS. 6 and 7 illustrate diagram of systems for providing real-time event detection including human review in accordance with one or more embodiments.
Figure 7:
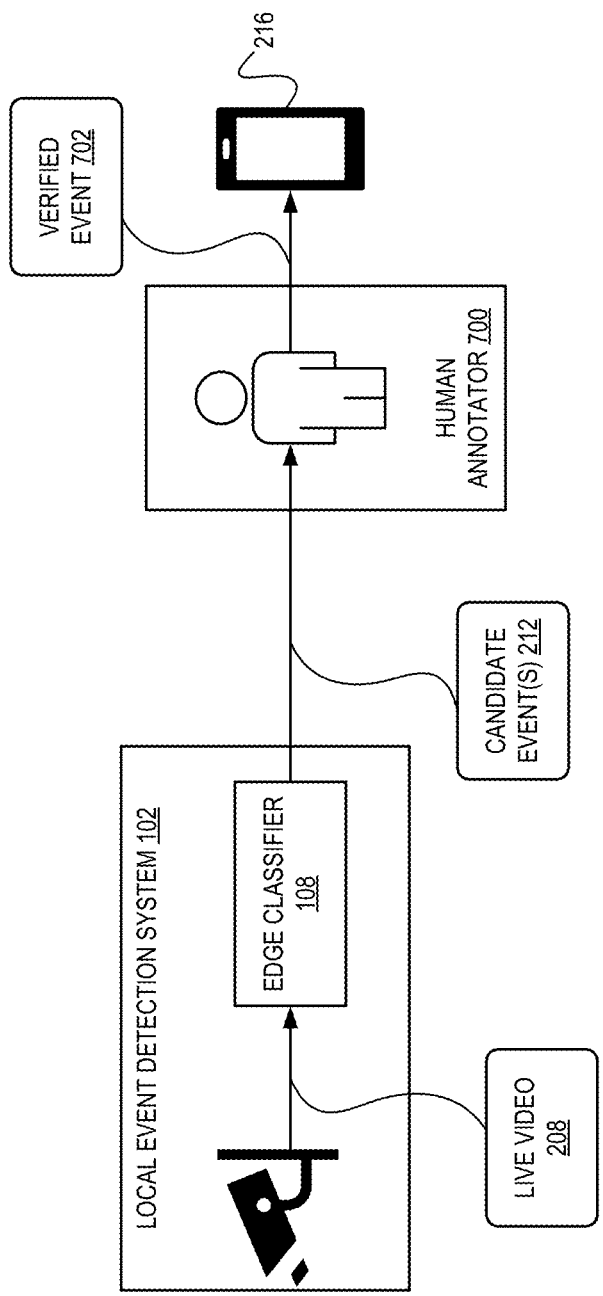

FIGS. 6 and 7 illustrate diagram of systems for providing real-time event detection including human review in accordance with one or more embodiments. In some embodiments, to further increase accuracy, particularly in the detection of critical events (e.g., weapon detection), it is possible to subject final system output to a human review before notifying the user. For example, as shown in FIG. 6, a human annotator 600 can be requested on-demand to inspect the video events that have been classified by the cloud classifier 112 as likely to include a depiction of an event. The human annotator 600 can then evaluate the video event 214 and determine whether it is a true positive or a false positive detection. In response to the determination by the human annotator the event notification may then be sent to the user. For example, if it is determined to be a true positive, then the event notification may be sent to the user. If, however, it is determined to be a false positive, then no notification may be sent to the user.

Involving a human annotator 600 may add a few seconds to the system latency required for the review. However, it can significantly improve the performance as the human can review and correlate the data in an unconstrained manner and this way achieve human-level detection performance. Once the human annotator 600 has reviewed the event 214, if the verified event 602 is confirmed then it is sent as a notification to the user's device 216.

In some embodiments, as shown in FIG. 7, a human annotator 700 can be requested to review the candidate events 212 identified by the edge classifier 108 either before, or instead of, processing the events by the cloud classifier 112. This may be particularly useful where the accuracy of edge classifier has been determined to be sufficiently high as to not first need verification by the cloud classifier 112. Likewise, for some types of emergency events, it may warrant human intervention earlier, even if the risk of a false positive by the edge classifier is relatively high. For example, a weapon detection event may warrant human verification at an earlier stage in an effort to react more quickly to the event. As in FIG. 6, once the human annotator 700 has reviewed the event, if the verified event 702 is confirmed then it is sent as a notification to the user's device 216.

Figure 8:
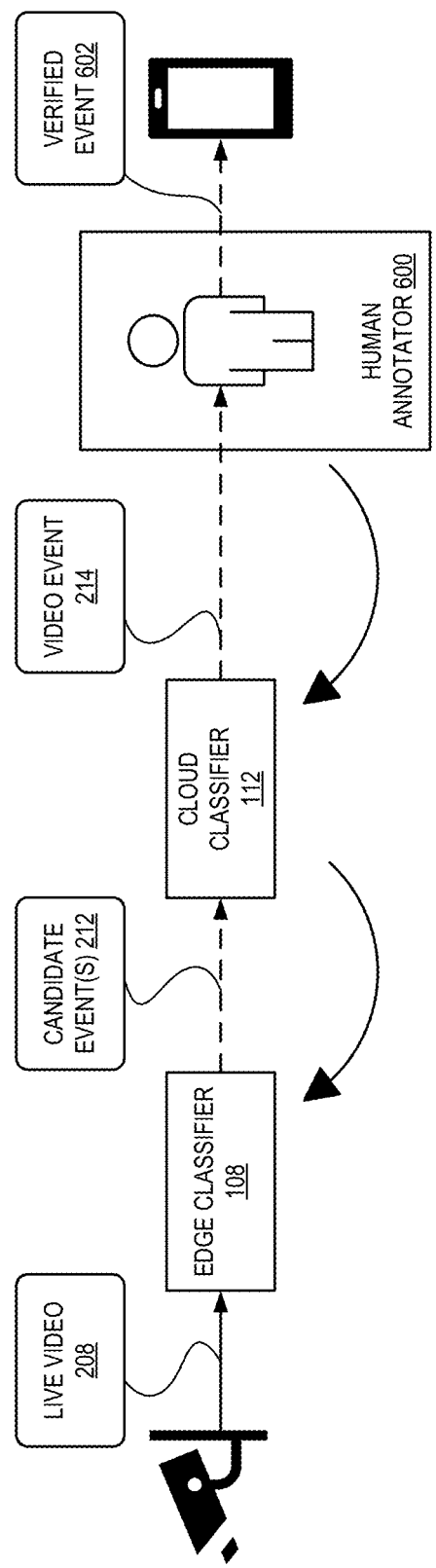
FIG. 8 illustrates a diagram of self-supervised improvement of a system for providing real-time event detection in accordance with one or more embodiments.

FIG. 8 illustrates a diagram of self-supervised improvement of a system for providing real-time event detection in accordance with one or more embodiments. The accuracy of the system can be improved over time in a self-supervised way after the system is deployed and processing real-world data. For example, the training data used to train the system may include data that is not the same as the data gathered in the deployment environment. Embodiments can improve the accuracy of the system by re-using the output of the higher-accuracy downstream parts of the pipeline to generate supervision labels for the lower-performance upstream parts of the pipeline.

For example, as shown in FIG. 8, an output of the cloud classifier 112 can be used as a supervision label for edge classifier 108. Optionally, an output of human review can be used as a supervision label of cloud classifier 112. These generated labels can be used with the corresponding original video clip data to retrain the corresponding components. For example, the labels generated by human annotator 600 and corresponding video events 214 can be used to retrain or fine tune cloud classifier 112. Similarly, the labels generated by the output of cloud classifier 112 and corresponding candidate events 212 can be used to retrain or fine tune edge classifier 108. In both instances, retraining the cloud classifier 112 and/or edge classifier 108 will increase their respective performance. This is because specific video data distribution and size observed during deployment might be different to that used during their initial training.

These supervision labels can be generated automatically as part of normal operation of the system. As a result, the supervision labels are generated at no extra cost compared to a dedicated labeling effort. Additionally, the resulting dataset of generated supervision labels is generated along the decision boundaries of the corresponding classifiers. This results in high data-efficiency as opposed to, e.g., random sampling.

Figure 9:
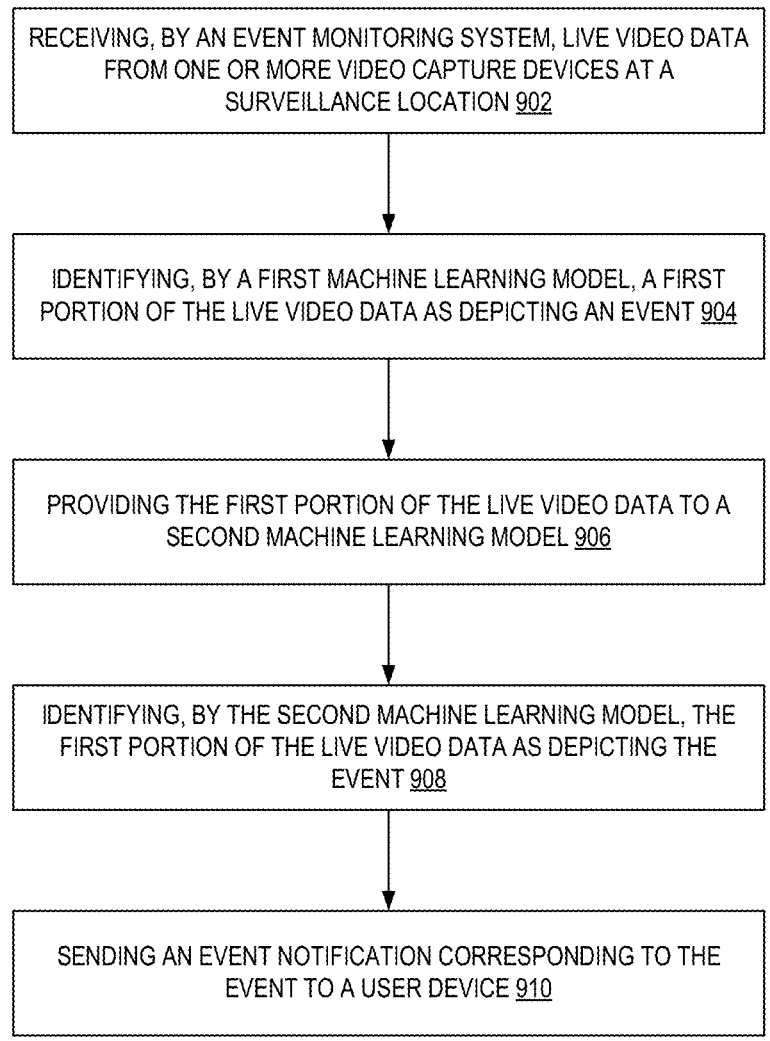
FIG. 9 illustrates a flowchart of a series of acts in a method of searching security video data in accordance with one or more embodiments.

FIG. 9 illustrates a flowchart of a series of acts in a method of searching security video data in accordance with one or more embodiments. In one or more embodiments, the method 900 is performed by or using the event monitoring system 100 (e.g., in a digital environment). The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving, by an event monitoring system, live video data from one or more video capture devices at a surveillance location. As discussed, the video capture devices may include IP cameras or other devices capable of capturing images and/or video data and streaming the video data over one or more networks. The event monitoring system comprises a local event detection system and a cloud-based event detection system, wherein the local event detection system includes one or more edge computing devices deployed at the surveillance location.

As illustrated in FIG. 9, the method 900 also includes an act 904 of identifying, by a first machine learning model, a first portion of the live video data as depicting an event. In some embodiments, the first machine learning model is hosted by the local event detection system. As discussed, the first machine learning model can be optimized for low latency, real-time processing of the live video data. In some embodiments, the first machine learning model is a binary classifier trained to detect an occurrence of an event in the live video data.

In some embodiments, the first machine learning model is an edge classifier and wherein the edge classifier is configured to compute, by a video embedding network, a vector embedding corresponding to the first portion of the live video data and determine, by an embedding classifier, that the first portion of the live video data depicts the event based on the vector embedding. In some embodiments, the embedding classifier compares the vector embedding to one or more reference embeddings corresponding to different event types.

As illustrated in FIG. 9, the method 900 also includes an act 906 of providing the first portion of the live video data to a second machine learning model. In some embodiments, as discussed, the first machine learning model is hosted by the local event detection system and the second machine learning model is hosted by a cloud-based event detection system. In some embodiments, the second machine learning model is optimized for accuracy. In some embodiments, the second machine learning model is a cloud classifier which includes a multi-modal large language model.

As illustrated in FIG. 9, the method 900 also includes an act 908 of identifying, by the second machine learning model, the first portion of the live video data as depicting the event. In some embodiments, identifying, by the second machine learning model, the first portion of the live video data as depicting the event further comprises receiving, by the second machine learning model, the first portion of the live video data and a text prompt requesting whether the first portion of the live video data depicts a known event type, and classifying, by the second machine learning model, the first portion of the live video data as depicting the event. In some embodiments, the multi-modal large language model is a Contrastive Language-Image Pre-Training (CLIP) model. In some embodiments, the first machine learning model and the second machine learning model are hosted by a cloud service provider.

As illustrated in FIG. 9, the method 900 also includes an act 910 of sending an event notification corresponding to the event to a user device. For example, the notification may include an email, a text message, a push notification, etc. In some embodiments, the notification can include the first portion of the live video data.

In some embodiments, the method further includes prior to sending the event notification to the user device, providing the first portion of the live video data to a human annotator for verification, and responsive to the event being verified by the human annotator, sending the event notification to the user device. In some embodiments, the method further includes labeling the first portion of the live video data based on the identification of the first portion of the live video by the second machine learning model or the human annotator, adding the labeled first portion of the live video data to a training dataset, wherein the training dataset includes a plurality of labeled portions of the live video data and a recording of the live video data, and fine-tuning at least the first machine learning model using the training dataset.

Figure 10:
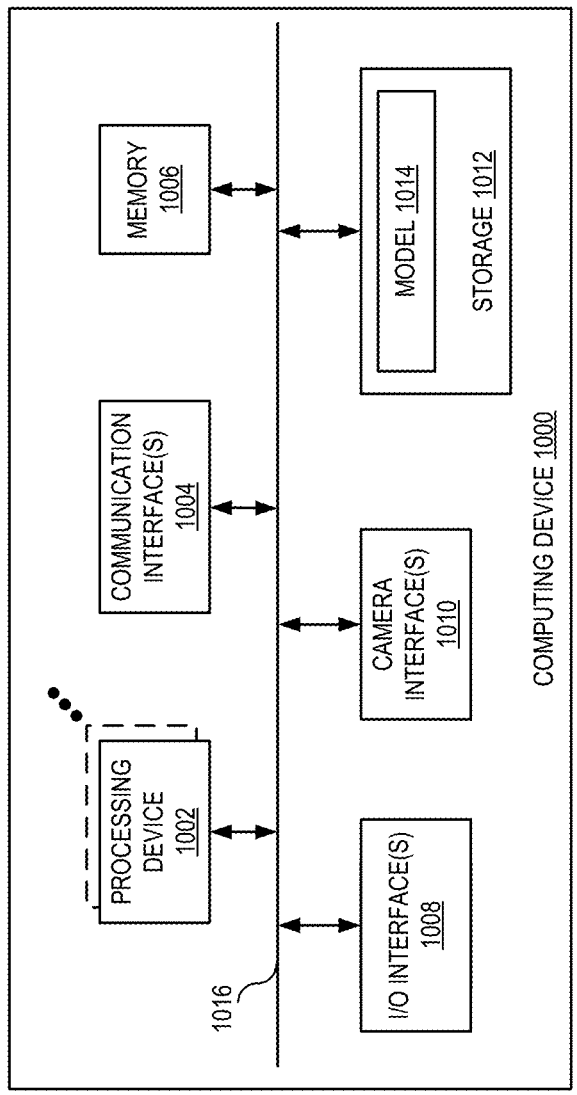
FIG. 10 illustrates a block diagram of an exemplary computing device in accordance with one or more embodiments.

FIG. 10 illustrates a block diagram of an exemplary computing device 1000 in accordance with one or more embodiments. The computing device 1000 may represent an NVR implementing the event monitoring system 100 which is configured to perform one or more of the processes described above. As shown in FIG. 10, the computing device can comprise a processing device 1002, communication interface(s) 1004, memory 1006, I/O interface(s) 1008, video capture device (e.g., camera) interface(s) 1010, and a storage device 1012 including at least one model 1014. In various embodiments, the computing device 1000 can include more or fewer components than those shown in FIG. 10. The components of computing device 1000 are coupled via a bus 1016. The bus 1016 may be a hardware bus, software bus, or combination thereof.

Processing device 1002 includes hardware for executing instructions. The processing device 1002 is configured to fetch, decode, and execute instructions. The processing device 1002 may include one or more central processing units (CPUs), graphics processing units (GPUs), accelerators, field programmable gate arrays (FPGAs), systems on chip (SoC), or other processor(s) or combinations of processors.

A communication interface(s) 1004 can include hardware and/or software communication interfaces that enable communication between computing device 900 and other computing devices or networks. Examples of communication interface(s) 1004 include a network interface controller (NIC) or network adapter for communicating with an Ethernet or other wire-based network or a wireless NIC (WNIC) or wireless adapter for communicating with a wireless network, such as a WI-FI, etc.

Memory 1006 stores data, metadata, programs, etc. for execution by the processing device. Memory 1006 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1006 may be internal or distributed memory.

In some embodiments, the computing device 1000 includes input or output ("I/O") interfaces 1008. The I/O interface(s) enable a user to interact with (e.g., provide information to and/or receive information from) the computing device 1000. Examples of devices which may communicate via the I/O interfaces 1008 include a mouse, keypad or a keyboard, a touch screen, camera, optical scanner, network interface, modem, or other I/O devices. The I/O interfaces 1008 may also facilitate communication with devices for presenting output to a user. This may include a graphics engine, a display (e.g., a display screen), one or more output drivers (e.g., display drivers), one or more audio speakers, and one or more audio drivers. In some embodiments, graphical data corresponding to a graphical user interface is provided to a display for presentation to a user using the I/O interfaces.

In some embodiments, computing device 1000 may include camera interfaces 1010. Camera interfaces 1010 may include high speed, high bandwidth, or otherwise specialized or dedicated interfaces to facilitate the transfer of large quantities of video data for processing by the computing device 1000 in real time.

The computing device 1000 also includes a storage device 1012 for storing data or instructions, and one or more machine learning models 1014, as described herein. As an example, and not by way of limitation, storage device 1012 can comprise a non-transitory computer readable storage medium. The storage device 1012 may include a hard disk drive (HDD), flash memory, a Universal Serial Bus (USB) drive or a combination of these or other storage devices.

Figure 11:
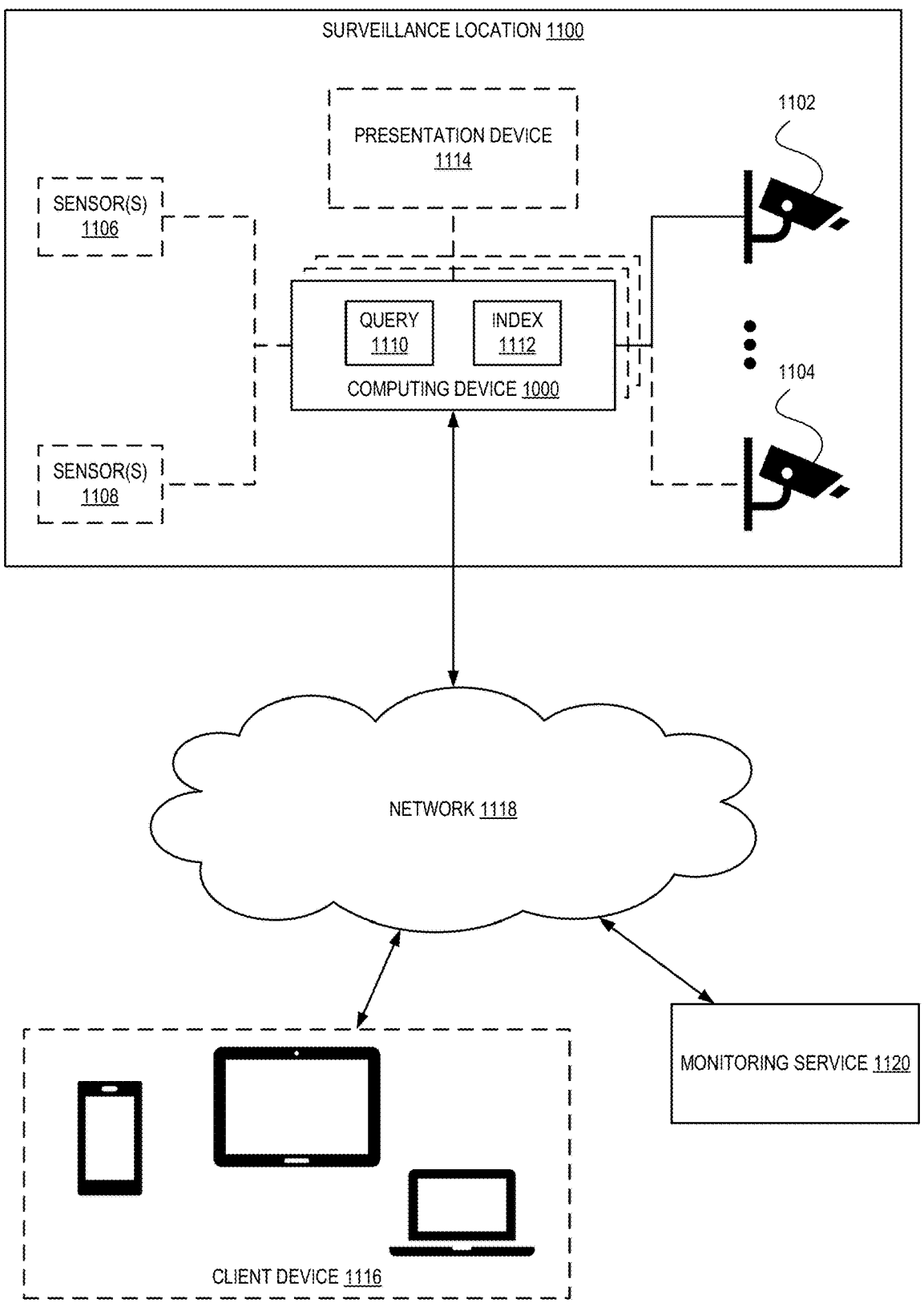
FIG. 11 illustrates a block diagram of an exemplary system in accordance with one or more embodiments.

FIG. 11 illustrates a block diagram of an exemplary system in accordance with one or more embodiments. In the example of FIG. 11 a surveillance location 1100 includes a computing device 1000 on which the event monitoring system 100 can operate in accordance with one or more embodiments. The surveillance location 1100 includes one or more video capture devices 1102-1104 in communication with the computing device 1000 (e.g., via local wired or wireless networks). In some embodiments, the surveillance location may also include one or more sensors 1106-1108. These may include other devices which capture information about the surveillance location, such as audio sensors, LiDAR sensors, rangefinders, monocular cameras, non-visible spectra cameras, etc.

As discussed, the event monitoring system 100 executing on computing device 1000 may include a query system 1110 and a video indexing system 1112. The query system 1110 enables users to search live or stored video using natural language search techniques. The video indexing system 1112 automatically generates embeddings for incoming video data and stores both the embedding data and video data for later search. A user may access the computing device 1000 via a local presentation device 1114 (e.g., monitor) and user input devices, or remotely via one or more client devices 1116. When accessed remotely, the computing device 1000 is accessed over one or more networks 1118, such as the Internet. In some embodiments, a monitoring service 1120 may be provided by a service provider or other entity to facilitate communication over the Internet between the client device 1116 and the computing device 1000. In various embodiments, the components shown in FIG. 11 may communicate using any communication platforms and technologies suitable for transporting data and/or communication signals, including any known communication technologies, devices, media, and protocols supportive of remote data communications.

As illustrated in FIG. 11, the environment may include client devices 1116. The client devices 1116 may comprise any computing device. For example, client devices 1116 may comprise one or more personal computers, laptop computers, mobile devices, mobile phones, tablets, special purpose computers, TVs, or other computing devices. Although three client devices are shown in FIG. 11, it will be appreciated that client devices 1116 may comprise any number of client devices (greater or smaller than shown).

The one or more networks 1118 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1118 may be any suitable network over which the client devices 1116 may access computing device 1000, monitoring service 1120, or vice versa.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method, comprising: receiving, by an event monitoring system, live video data from one or more video capture devices at a surveillance location; identifying, by a first machine learning model, a first portion of the live video data as depicting an event; providing the first portion of the live video data to a second machine learning model; obtaining, by the second machine learning model, a text prompt requesting whether the first portion of the live video data depicts a known event type; classifying, by the second machine learning model, the first portion of the live video data as depicting the event; and sending an event notification corresponding to the event to a user device.

2. The method of claim 1, wherein the event monitoring system comprises a local event detection system and a cloud-based event detection system, wherein the local event detection system includes one or more edge computing devices deployed at the surveillance location.

3. The method of claim 2, wherein the local event detection system hosts the first machine learning model which is optimized for low latency, real-time processing of the live video data.

4. The method of claim 3, wherein the first machine learning model is a binary classifier trained to detect an occurrence of an event in the live video data.

5. The method of claim 3, wherein the first machine learning model is an edge classifier and wherein the edge classifier is configured to:
compute, by a video embedding network, a vector embedding corresponding to the first portion of the live video data, wherein the video embedding network is a Contrastive Language-Image Pre-Training (CLIP) model; and
determine, by an embedding classifier, that the first portion of the live video data depicts the event based on the vector embedding.

6. The method of claim 5, wherein the embedding classifier compares the vector embedding to one or more reference embeddings corresponding to different event types.

7. The method of claim 2, wherein the cloud-based event detection system hosts the second machine learning model which is optimized for accuracy.

8. The method of claim 2, wherein the second machine learning model is a cloud classifier which includes a multimodal large language model.

9. The method of claim 1, wherein the first machine learning model and the second machine learning model are hosted by a cloud service provider.

10. The method of claim 1, further comprising:
prior to sending the event notification to the user device, providing the first portion of the live video data to a human annotator for verification; and
responsive to the event being verified by the human annotator, sending the event notification to the user device.

11. The method of claim 10, further comprising:
labeling the first portion of the live video data based on the identification of the first portion of the live video by the second machine learning model or the human annotator;
adding the labeled first portion of the live video data to a training dataset, wherein the training dataset includes a plurality of labeled portions of the live video data and a recording of the live video data; and
fine-tuning at least the first machine learning model using the training dataset.

12. A non-transitory computer-readable storage medium including instructions which, when executed by a processor, cause the processor to perform operations comprising: receiving, by an event monitoring system, live video data from one or more video capture devices at a surveillance location; identifying, by a first machine learning model, a first portion of the live video data as depicting an event; providing the first portion of the live video data to a second machine learning model; obtaining, by the second machine learning model, a text prompt requesting whether the first portion of the live video data depicts a known event type; classifying, by the second machine learning model, the first portion of the live video data as depicting the event; and sending an event notification corresponding to the event to a user device.

13. The non-transitory computer-readable storage medium of claim 12, wherein the event monitoring system comprises a local event detection system and a cloud-based event detection system, wherein the local event detection system includes one or more edge computing devices deployed at the surveillance location.

14. The non-transitory computer-readable storage medium of claim 13, wherein the local event detection system hosts the first machine learning model which is optimized for low latency, real-time processing of the live video data.

15. The non-transitory computer-readable storage medium of claim 14, wherein the first machine learning model is an edge classifier and wherein the edge classifier is configured to:
- compute, by a video embedding network, a vector embedding corresponding to the first portion of the live video data; and
- determine, by an embedding classifier, that the first portion of the live video data depicts the event based on the vector embedding, wherein the embedding classifier compares the vector embedding to one or more reference embeddings corresponding to different event types.

16. The non-transitory computer-readable storage medium of claim 12, wherein the cloud-based event detection system hosts the second machine learning model which is optimized for accuracy.

17. The non-transitory computer-readable storage medium of claim 12, wherein the second machine learning model is a cloud classifier which includes a multi-modal large language model and wherein the operation of identifying, by the second machine learning model, the first portion of the live video data as depicting the event further comprises: receiving, by the second machine learning model, the first portion of the live video data and a text prompt requesting whether the first portion of the live video data depicts a known event type; and classifying, by the second machine learning model, the first portion of the live video data as depicting the event.

18. A system, comprising: one or more video capture devices positioned at a surveillance location; and an event monitoring system coupled to the one or more video capture devices at the surveillance location, wherein the event monitoring system includes at least one processor which performs operations comprising: receiving live video data from one or more video capture devices at the surveillance location; identifying, by a first machine learning model, a first portion of the live video data as depicting an event; providing the first portion of the live video data to a second machine learning model; obtaining, by the second machine learning model, a text prompt requesting whether the first portion of the live video data depicts a known event type; classifying, by the second machine learning model, the first portion of the live video data as depicting the event; and sending an event notification corresponding to the event to a user device.

19. The system of claim 18, wherein the event monitoring system comprises a local event detection system and a cloud-based event detection system, wherein the local event detection system includes one or more edge computing devices deployed at the surveillance location, and wherein the local event detection system hosts the first machine learning model which is optimized for low latency, real-time processing of the live video data.

* * * * *